United States Patent [19]

Hu et al.

[11] 4,290,644
[45] Sep. 22, 1981

[54] RECESS-VENTILATED COLLAPSIBLE TENT MOTORCYCLE SEAT

[76] Inventors: Jinn-Yih Hu; Kun-Si Hu; Sue-Jan Hu, all of 3rd Fl., No. 74-2, Lan-Chu St., Taipei, Taiwan

[21] Appl. No.: 100,276

[22] Filed: Dec. 5, 1979

[51] Int. Cl.³ .............................. B60J 7/20; B62J 1/18
[52] U.S. Cl. .................................. 297/195; 296/78.1; 296/136; 297/202; 297/214
[58] Field of Search ............... 297/195, 202, 214, 184; 296/36, 78 R, 78.1, 136

[56] References Cited

U.S. PATENT DOCUMENTS

| 718,850 | 1/1903 | Kruseman | 297/202 X |
| 3,514,156 | 5/1970 | Fields | 297/195 X |
| 3,537,746 | 11/1970 | Peters | 296/78.1 |
| 3,836,196 | 9/1974 | Hu | 297/195 |
| 3,884,523 | 5/1975 | Allen | 297/184 X |
| 4,114,633 | 9/1978 | Herbez | 296/136 X |
| 4,171,145 | 10/1979 | Pearson, Sr. | 296/78.1 |

Primary Examiner—Roy D. Frazier
Assistant Examiner—Peter A. Aschenbrenner
Attorney, Agent, or Firm—Tak Ki Sung

[57] ABSTRACT

This invention consists of a recess-ventilated collapsible tent motorcycle seat especially referring to a motorcycle seat with a ventilation recess of appropriate width longitudinally down the middle of the seat, said recess having along its bottom a plurality of ventilation holes, the middle of said recess being equipped with a tent mechanism which can be easily erected and collapsed.

1 Claim, 9 Drawing Figures

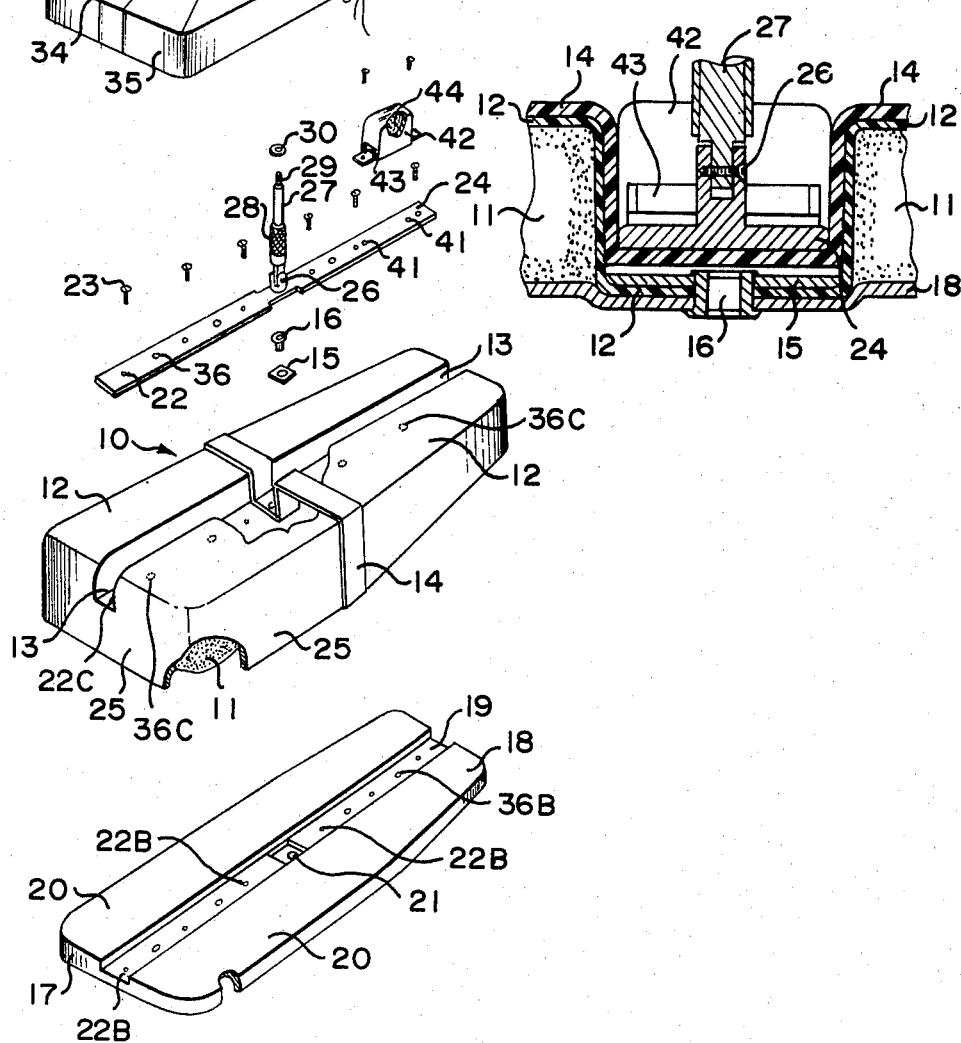

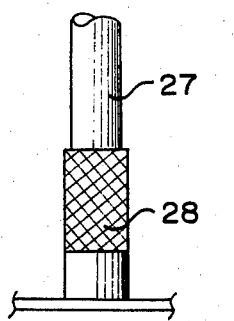
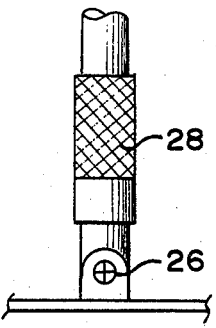
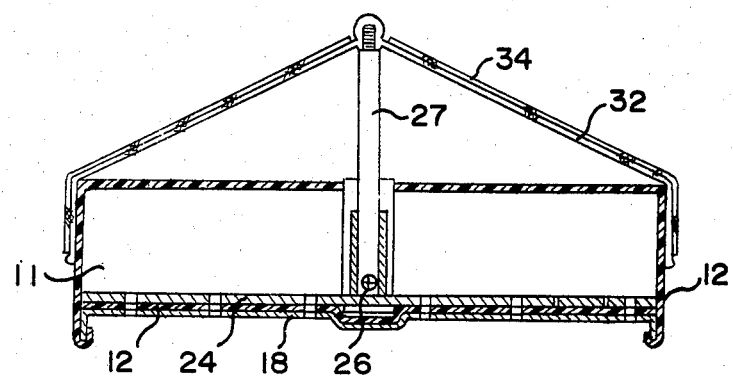
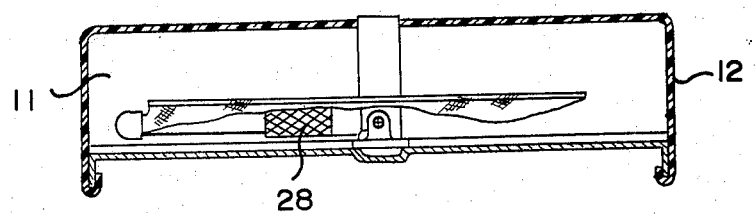

RECESS-VENTILATED COLLAPSIBLE TENT MOTORCYCLE SEAT

FIELD OF THE INVENTION

The present invention relates to a motorcycle seat cover which can be easily erected and collapsed, thereby protecting the seat top from the ill-effects of intensive sunlight, foul weather, and dust.

BACKGROUND OF THE INVENTION

All of the motorcycle seats currently on the market have a solid, compact form, so that whenever the motorcycle is left outside in intense sunlight or pouring rain, the seat becomes either burning hot, sopping wet, or covered with dust. Each of these conditions greatly bothers riders, because pants are dirtied or their bodies are greatly discomforted and harmed, perhaps even to the extent of requiring medical treatment. In view of these many problems, these defects in conventional motorcycle seats should be improved.

BRIEF DESCRIPTION OF DRAWINGS

In order to facilitate understanding the following drawings and explanations have been prepared:

FIG. 1. An oblique, exploded drawing of the complete invention;

FIG. 2. A cross-section of the base of the mounting rod;

FIGS. 6A and 6B. A detailed view of the sleeve joint which secures the mounting rod in a verticle position;

FIG. 7. A longitudinal cross-section of the seat, mounting rod, and erected tent;

FIG. 8. A longitudinal cross-section of the seat, lowered mounting rod, and collapsed tent.

DETAILED DESCRIPTION OF THE PRESENT INVENTION

Figure 3:
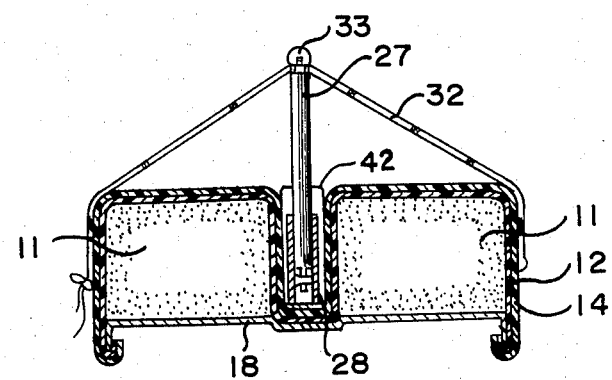
FIG. 3. A latitudinal cross-section of the seat, mounting rod, and erected tent.
Figure 4:
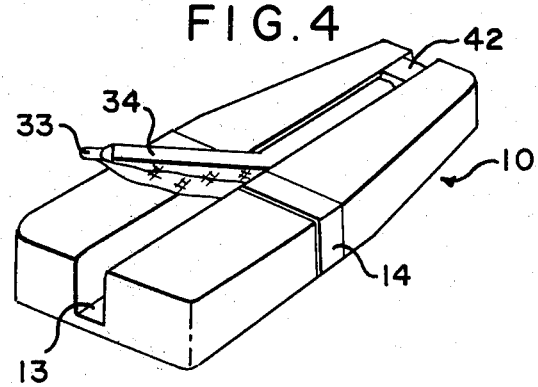
FIG. 4. An oblique drawing of the seat with the tent and mounting rod partially erected.

As FIG. 1 shows, the present invention is composed of two pieces of sponge 11, covered by a layer of plastic 12. (See also FIG. 2.) The sponges 11 are placed parallel to each other with a ventilation recess 13 passing between them to form the main body 10 of the invention. In the middle of the ventilation recess hollow rivet 16 over a small square metal washer 15 is placed to attach the sponge cushion 11 and plastic cover 12 to the base 18 beneath. Across the middle of the main body 10 and above the hollow rivet 16 and metal washer 15 is placed a plastic strap 14 to which riders in the back may hold. Underneath the sponge and cover is a base 18 with an edge 17 which runs perpendicular to the base 18 along its four sides. Also longitudinally down the center of base 18 is a recess 19, slightly shallower towards the front of the base, which is of equal length and slightly greater width than ventilation recess 13. In the center of recess 19 is a small square depressed area 21 in which there is a small hole through which the rivet 16 can pass to secure it firmly to the main sponge body and plastic cover 12. Also along the bottom of the recess 19 are a plurality of holes 22 through which screws may pass and a plurality of ventilation holes 36. The flat surfaces 20 of base 18 which lie alongside recess 19 are covered with a strong adhesive which securely and firmly attaches the two sponges 11 of main body 10 to the base 18. Also through recess 13 of main body 10 is placed a plate 24 which can be attached to base 18 by fastening screws 23 through holes 22 and holes 22C in the plastic 12 into screw-threaded holes 22B in base 18. The back passenger strap 14 is securely attached to the bottom of recess 13 by plate 24 which is securely fixed on top of it. The excess of plastic 12 along the edge 25 used to cover the main body and the outer edges of the back passenger strap 14 are attached to the inner side of edge 17 which circumvents the base 18. Along plate 24 are placed a plurality of ventalation holes 36 which holes also coincide with other ventilation holes 36C in the plastic cover and holes 36B in base 18. Towards the front of mounting plate 24 are placed two screw holes 41 through which can be fixed the base 43 of a small wedge 42 made of sponge 44 and covered with plastic identical to plastic 12 covering the main body 10; said wedge being placed to increase the solid stability of the main body 10 when it is subject to deformation due to the weight of the rider. In the middle of plate 24 is a hinged joint 26 comprising a mounting bracket, a hinge pin and a sliding socket. A mounting rod 27 is pivotally connected to said mounting bracket with said hinge pin, and said sliding socket is arranged to slide along the outer surface of said mounting rod and over said mounting bracket when said mounting rod is erected in substentially vertical position so as to lock said mounting rod 27. At the top of the mounting rod are screw threads 29 over which a washer 30 is placed. Above said washer 30 and below an additional washer 31 is placed a heat-proofed and water proofed small tent 32. A small nut 33 screwed onto threads 29 above the washer 31 secures the whole in place. Longitudinally along the top of tent 32 are placed two strips of cloth 34 whose width will be approximately that of the venting recess, which are to be made of cloth substantially heavier than that used in tent 32. Around the edges of tent 32 is to be placed a strip of an elastic nature which will firmly hold down the edges of tent 32 to the edges of the main body 10 of the seat. When the tent is erected over the main body 10 approximately ⅓ of the end of the venting recess will still be unblocked, thereby, along with ventilation holes 36, allowing fresh and cool air to circulate freely through the tent and thus improve its heat resistant capacities.

Figure 5:
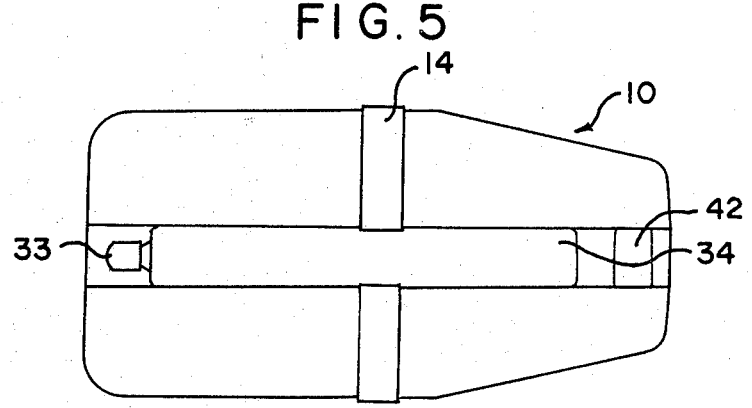
FIG. 5. A top view with tent retracted.

When the present invention is to be used, first raise and then use sliding socket 28 to lock the mounting rod 27 into an erect position. Then open and spread heat and water proofed tent 32 over the seat using elastic strip 35 to secure it to the edges of the seat, ensuring to leave the end of the venting recess exposed. As the tent is made of water proofed material, the present invention will keep the motorcycle seat dry in wet weather. Also, because air is not a good heat conductor, the air pocket between the tent and the seat top, along with fresh ventilation from the ends of the venting recess 13 and the ventilation holes 36, will help keep the seat from becoming overly heated. The erected tent will also keep the seat free of dust. As the mounting rod 27 can be easily and conveniently operated, when not in use the tent 32 can be collapsed. The sliding socket 28 can be slid away from hinged joint 26 allowing mounting rod 27 and tent 32 to be lowered into the venting recess 13. Then the thicker and stiffer strips 34 may be arranged with the material of tent 32 underneath them, so as to give the seat a pleasing appearance. (See FIG. 5) Furthermore, any rain water which may fall on the seat, for instance while the tent is not in use, will flow out through the ends of the venting recess when the motorcycle is in motion.

The present invention is convenient in use, provides effective results, is of simple and outstanding construction, inexpensive, unique in the market place, beneficial to health, and suitable for large-scale production.

What is claimed is:

1. A recess ventilated collapsible tent motorcycle seat, a small wedge being mounted towards the front of said recess; in the middle of said recess, an erectable and collapsible mounting rod being provided, from which mounting rod is attached suspended a small heat-, rain- and dust-resistant tent on which tent are attached strips of relatively thicker material which can cover the entire mechanism when the tent is collapsed into the ventilation recess; which tent when erected leaves open a portion of the end of the ventilating recess to permit the flow of air, the ventilation recess having a plurality of venting holes in its bottom to permit further flow of air so as to render the tent heat resistant.

* * * * *

UNITED STATES PATENT AND TRADEMARK OFFICE
CERTIFICATE OF CORRECTION

PATENT NO. : 4,290,644
DATED : September 22, 1981
INVENTOR(S) : Jinn-Yih Hu et al.

It is certified that error appears in the above-identified patent and that said Letters Patent is hereby corrected as shown below:

Claim 1, line 2, delete the comma and insert -- comprising a ventilation recess in the main body of the seat; --.

Signed and Sealed this

Seventeenth Day of August 1982

[SEAL]

Attest:

GERALD J. MOSSINGHOFF

Attesting Officer       Commissioner of Patents and Trademarks